(12) United States Patent
Fürst

(10) Patent No.: US 10,688,691 B2
(45) Date of Patent: Jun. 23, 2020

(54) FOAMING AND PUNCHING TOOL AND METHOD FOR PRODUCING FOAMED PRODUCTS

(71) Applicant: POLYTEC CAR STYLING HÖRSCHING GMBH, Hörsching (AT)

(72) Inventor: Gerhard Fürst, Wartberg (AT)

(73) Assignee: POLYTEC CAR STYLING HÖRSCHING GMBH, Hörsching (AT)

( * ) Notice: Subject to any disclaimer, the term of this patent is extended or adjusted under 35 U.S.C. 154(b) by 399 days.

(21) Appl. No.: 15/554,778

(22) PCT Filed: Feb. 24, 2016

(86) PCT No.: PCT/EP2016/053823
§ 371 (c)(1),
(2) Date: Aug. 31, 2017

(87) PCT Pub. No.: WO2016/139091
PCT Pub. Date: Sep. 9, 2016

(65) Prior Publication Data
US 2018/0236695 A1   Aug. 23, 2018

(30) Foreign Application Priority Data

Mar. 2, 2015   (DE) ........................ 10 2015 203 662

(51) Int. Cl.
*B29C 37/02* (2006.01)
*B29C 44/40* (2006.01)
*B29C 44/56* (2006.01)
*B29C 44/58* (2006.01)
*B29C 33/00* (2006.01)
*B29K 75/00* (2006.01)

(52) U.S. Cl.
CPC .......... *B29C 37/02* (2013.01); *B29C 33/0055* (2013.01); *B29C 44/40* (2013.01); *B29C 44/5627* (2013.01); *B29C 44/585* (2013.01); *B29C 44/588* (2013.01); *B29K 2075/00* (2013.01)

(58) Field of Classification Search
CPC ........... B29C 33/0055; B29C 44/5627; B29C 44/585; B29C 44/586; B29C 45/14024; B29C 2043/3615; B29C 37/04; B29C 2045/0077; B29C 49/50; B29C 49/72; B29C 2049/725; B29C 49/74
See application file for complete search history.

(56) References Cited

U.S. PATENT DOCUMENTS 4,555,087 A * 11/1985 Wallner ................. B29C 33/10
249/78

FOREIGN PATENT DOCUMENTS

CN   1246822 A   3/2000
CN   102292198 A   12/2011
(Continued)

OTHER PUBLICATIONS

International Search Report for International Application No. PCT/EP2016/053823 dated Jun. 7, 2016.

*Primary Examiner* — Stella K Yi
(74) *Attorney, Agent, or Firm* — Clements Bernard Walker

(57) ABSTRACT

The invention relates to a foaming and punching tool for producing foamed products from structural foam, and to a method for producing such foamed products.

6 Claims, 23 Drawing Sheets

(56) References Cited

FOREIGN PATENT DOCUMENTS

| | | | |
|---|---|---|---|
| DE | 2160691 | | 6/1972 |
| DE | 2609373 | * | 9/1977 |
| DE | 2609373 | A1 | 9/1997 |
| DE | 29714659 | U1 | 11/1997 |
| JP | 6440614 | U | 3/1989 |
| JP | 2009166321 | | 7/2009 |
| JP | 2011218798 | | 3/2011 |

* cited by examiner

FOAMING AND PUNCHING TOOL AND METHOD FOR PRODUCING FOAMED PRODUCTS

FIELD OF THE INVENTION

The invention relates to a foaming and punching tool for producing foamed products made of integral foam, and to a corresponding method for producing said foamed products.

BACKGROUND OF THE INVENTION

DE 2 116 691 A describes a method for producing elastic compressed polyurethane foams. In a discontinuous process mode, the method herein described is performed by foaming the foamable polyurethane mixture in a usual mold, for example, a cardboard box, removing said mold from the partially cured foam composition after lapse of the crush time while the previously mentioned temperature ranges are maintained, and compressing the foam composition. Preferably, the mold into which the foamable polyurethane mixture is fed is dimensioned so that the finished polyurethane foam can be used in this shape, or after a cutting process for removing the skin, which generally forms at the separating edges of the molded part.

DE 26 09 373 A1 relates to a mold for producing molded parts made of integral foam. It describes a molded part made of integral foam or similarly processable plastic foams, wherein said mold consists of two or more mold pieces, and the edges of the molded parts are pressed together joint-tightly. The purpose is to create a mold in which optimum aeration is obtained, and in which at the same time the molded part can be produced without drive-out burrs, without there being a risk of incomplete mold filling. This is to be achieved by having the support surfaces of the joints continuously as narrow as possible in the mold herein defined, and assigning control elements for the predetermined joint gap to the joints. At first, a small adjustable joint gap is used to ensure that only a relatively small proportion of the reaction mass gets outside the mold cavity through the joints. In addition, the narrow support surfaces of the joint enable the mold to be closed very tightly immediately after the foaming process. Because of the narrow support surface, the usual closing forces can achieve so high a specific pressure that the driven-out mass is squeezed directly at the mold edge.

BRIEF SUMMARY OF THE INVENTION

When molded parts are produced from PU integral foam or similar foams, since the material is foamed, it cannot be avoided that the reaction mixture penetrates through the joints of the mold, and thus tedious reworking is required after demolding. On the other hand, such a discharge is desired in order to ensure that enclosed air within the molded part is avoided.

Accordingly, it is the object of the present invention to provide a mold that no longer necessitates additional reworking by manual or machine trimming or milling.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
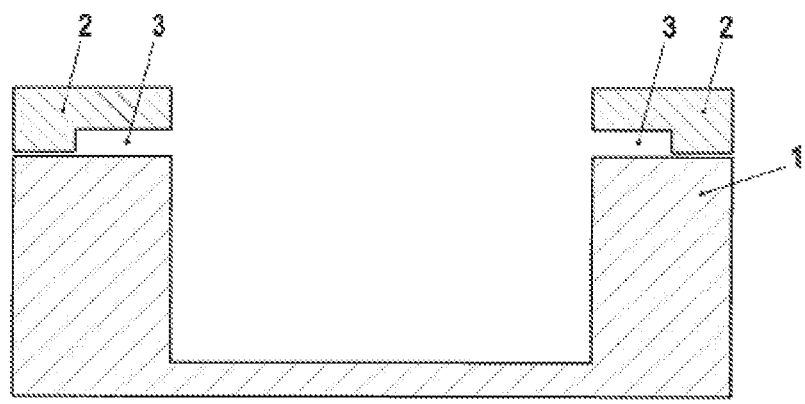
FIG. 1 illustrates the lower mold of the mold cavity and top piece.

In a first embodiment, the above object is achieved by a foaming and punching tool for producing foamed products 4 made of integral foam, comprising a lower mold 1 and a circumferential top piece 2 present at the upper side thereof, which forms a groove 3 together with said lower mold 1 that faces the mold cavity, and an upper mold 6, wherein in a first closed condition said upper mold 6, due to spacers 5, penetrates into the mold cavity only to such an extent that the groove 3 can receive foaming material 4, and in a second closed condition said upper mold 6 penetrated deeper into the mold cavity after said spacers 5 have been removed and optionally replaced by thinner spacers 5a, and can remove material 4 present in the groove 3 by punching on its way into the latter condition.

Because of the small distance between the two molds 1, 6 in the foaming condition, a small proportion of the reaction mixture 4 can penetrate through the joint into a ventilation groove 3 provided for this purpose, and a part that is free from air bubbles can be produced.

In order that the two molds 1, 6 do not move entirely towards each other when the mold is closed, spacers 5, 5a are inserted between the two molds 1, 6, especially by pneumatic insertion. After the molded part 4 has cured in the foaming and punching tool, the spacers 5 are removed from the tool, and the two molds 1, 6 are pressed together. During this movement, the discharged material is punched off by one or more drive-over steps of the two molds 1, 6. Since the mold material 4 is soft and can be compressed, this punching stroke is possible with a relatively low force acting on the molds. When the punching stroke has been performed, the mold is opened, and the molded part 4 is removed. The latter can then be supplied to the further processes without being reworked.

As compared to currently known mold technologies, a particular advantage of the present invention resides in the fact that a complicated control of the mold by different degrees of rising of the reaction mass is not necessary. By means of the present invention, the mold joints are not soiled by the displacing and subsequent compressing of the reaction mass, so that cleaning is not required. Another advantage of the present invention resides in the fact that the drive-over step produces exactly punched edges at the molded part 4. Thus, it is not required to rework the molded part 4. The design of the mold is also relatively simple. The discharged material is punched rather than squeezed.

Figure 2:
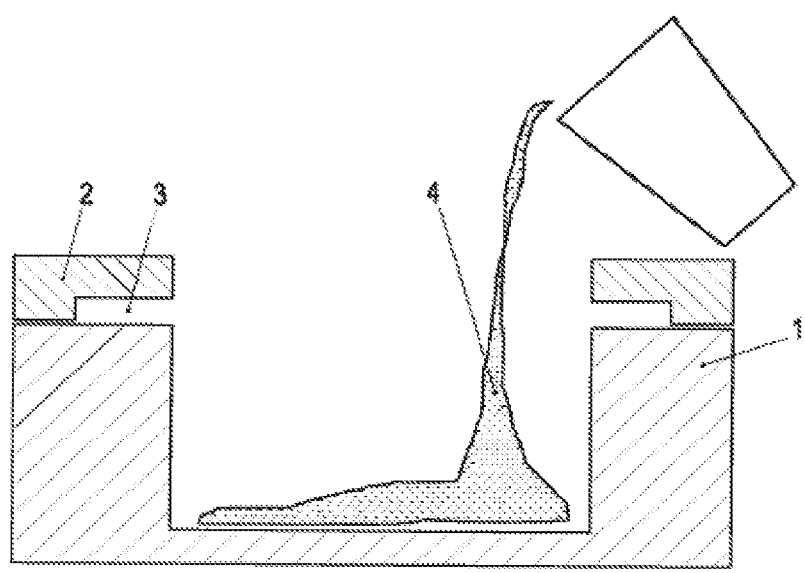
FIG. 2 illustrates the lower mold, the top piece and the foamable material.
Figure 3:
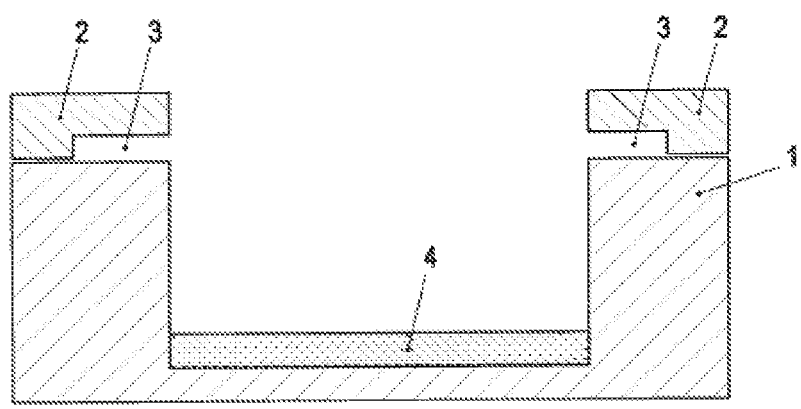
FIG. 3 illustrates the lower mold, the top piece, and the foamable material on the bottom of the mold cavity.

FIG. 1 shows the lower mold 1 with a mold cavity, which is represented as a rectangle here. The top piece 2 is situated circumferentially on the lower mold 1, forming a groove 3 on the upper edge of the lower mold 1. In FIG. 2, the lower mold 1 with the top piece 2 is described, and the foamable material is filled in. A defined amount of a foamable material 4 is filled into the mold cavity and distributes at first on the bottom of the mold cavity, as shown in FIG. 3.

Figure 4:
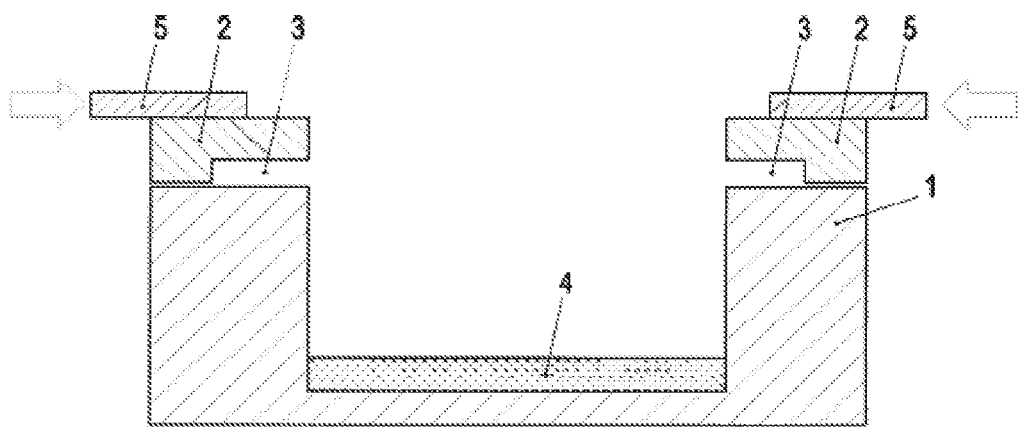
FIG. 4 illustrates the lower mold, top piece, and spacer.
Figure 5:
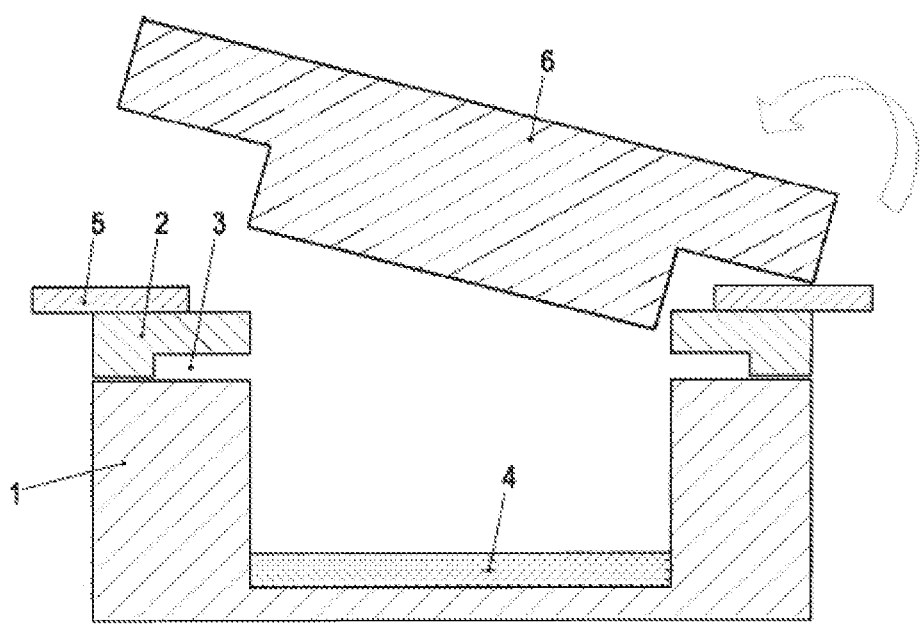
FIG. 5 illustrates the lower mold, top piece, spacer, and upper mold.
Figure 6:
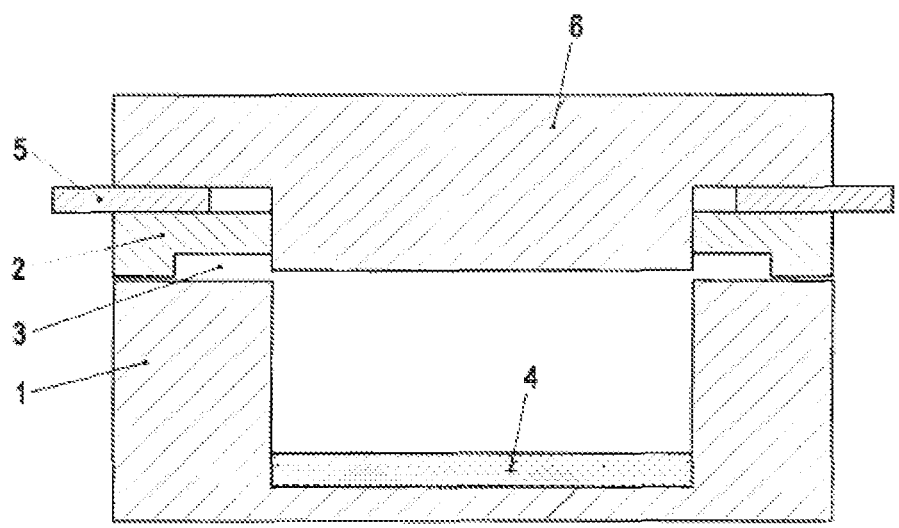
FIG. 6 illustrates the first closing condition of the mold.
Figure 7:
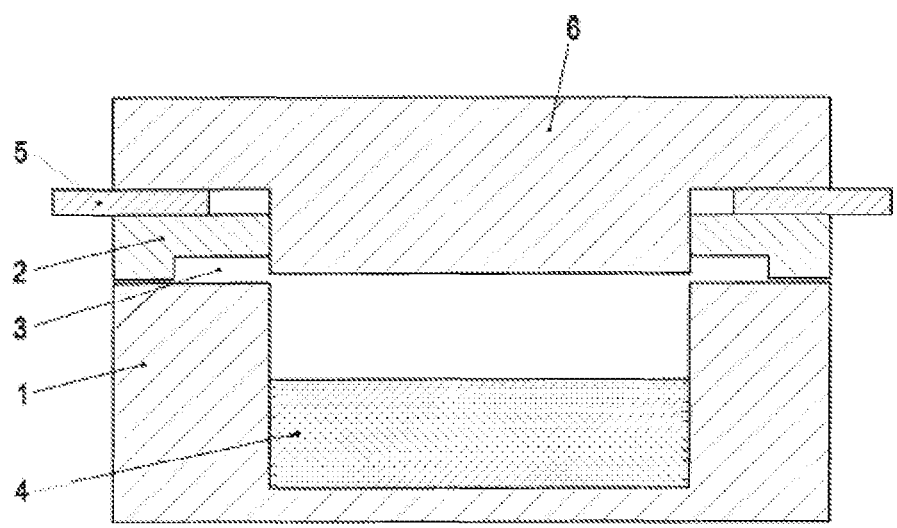
FIG. 7 illustrates the first closing condition of the mold when the foamable material foams.
Figure 8:
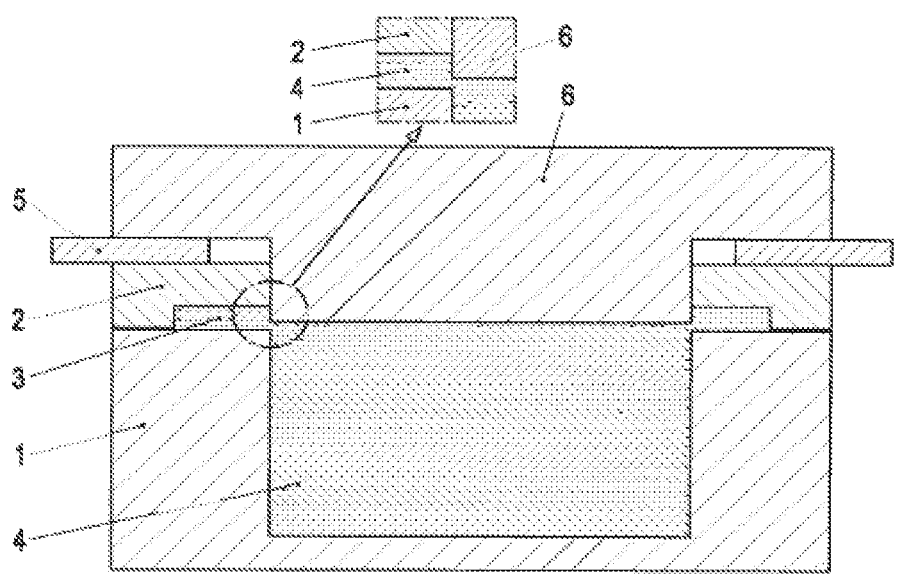
FIG. 8 illustrates a detail of the region of the groove in addition to the foamed filled cavity.
Figure 9:
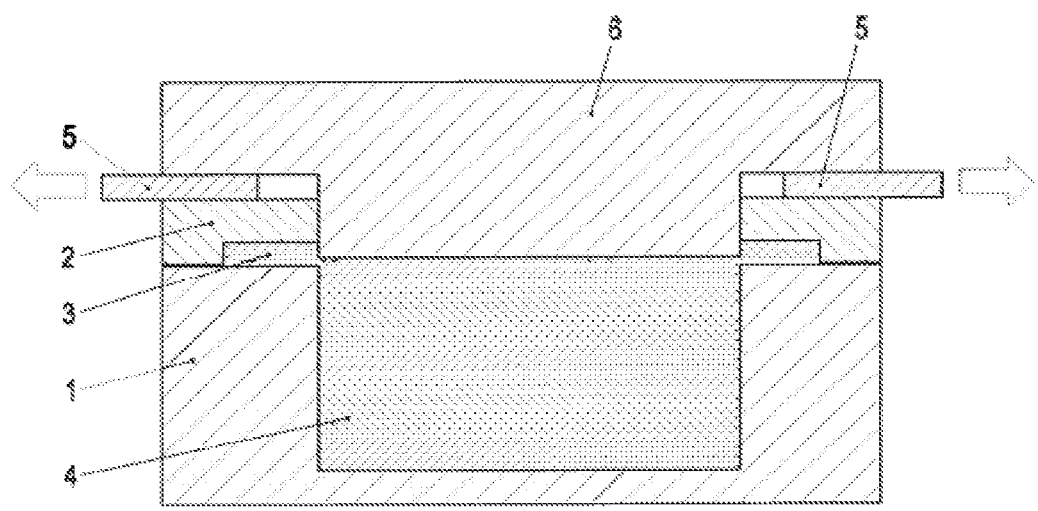
FIG. 9 illustrates the mold cavity and groove completely filled with the foamed material.

FIG. 4 shows the spacers 5, which prevent the upper mold 6 from completely penetrating as shown in FIG. 5. FIG. 6 shows the first closing condition of the mold, in which the mold cavity essentially has the geometry of the molded part. The thus obtainable first condition allows the foamable material 4 to freely pass into the groove 3 when the material foams accordingly as shown in FIG. 7. FIG. 8 shows a detail of the region of the groove 3, in addition to the foam-filled mold cavity In FIG. 9, the mold cavity and the groove 3 are completely filled with the foamed material. After the foamed material has cured, the spacers 5 are removed as shown by the arrows, to achieve the condition according to FIG. 10.

Figure 10:
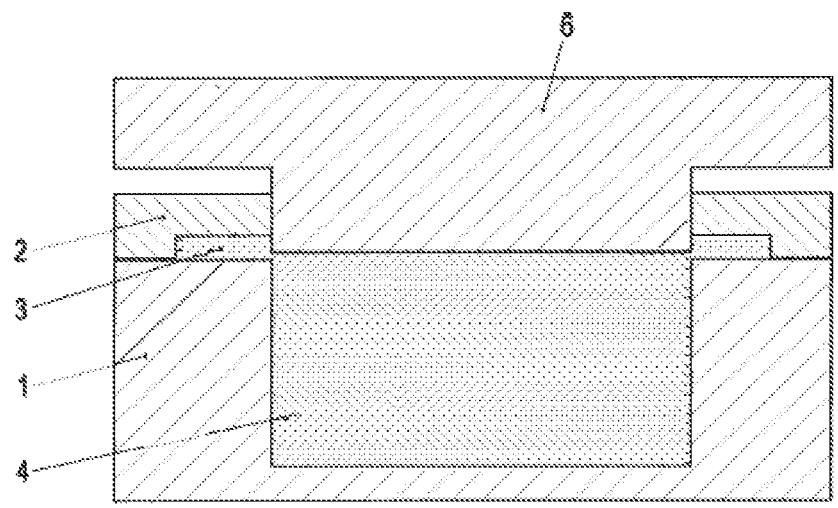
FIG. 10 illustrates the mold when the spacers have been removed.
Figure 11:
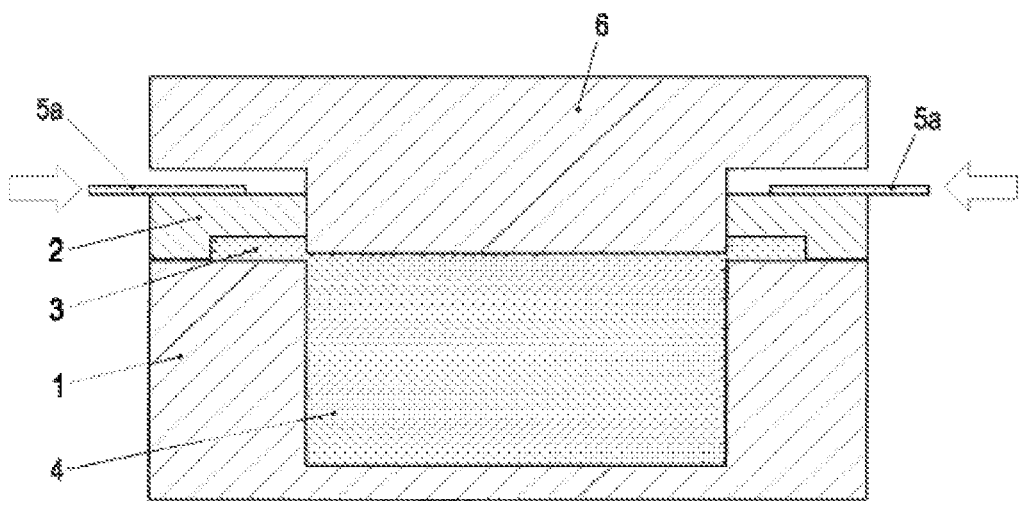
FIG. 11 illustrates the relative movement of the upper mold.
Figure 12:
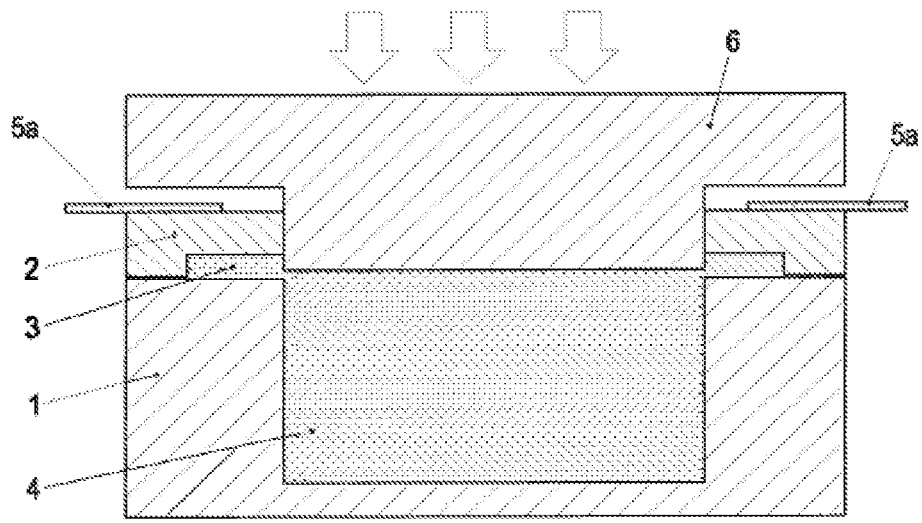
FIG. 12 also illustrates the relative movement of the upper mold.

By optionally inserting thinner spacers 5a, the upper mold 6 can compress the foamed material and at the same time separate the foamed material 4 present in the groove 3 from the material present in the mold cavity by punching. This relative movement of the upper mold 6 is shown in FIGS. 10, 11 and 12.

Figure 13:
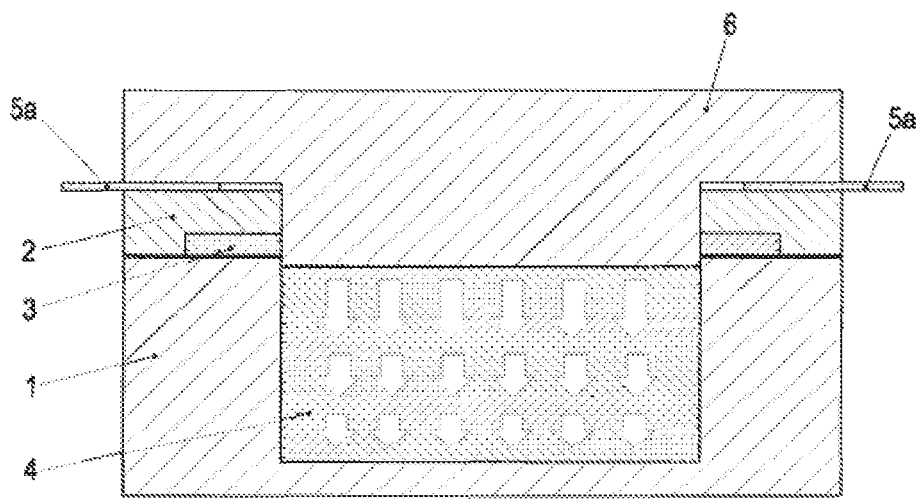
FIG. 13 illustrates the end position of the upper mold.

The end position of the upper mold 6 is shown in FIG. 13. Here, the foamed material 4 in the groove 3 has already been separated off in one step. The arrows in the mold cavity indicate that the molded part has been compressed. Alternatively, however, it is also particularly preferred to perform the punching in several steps. Thus, accordingly adapted molds 1, 6 exerting the punching stroke, which are moved or guided mechanically, i.e., hydraulically or pneumatically, in particular, are employed.

Figure 14:
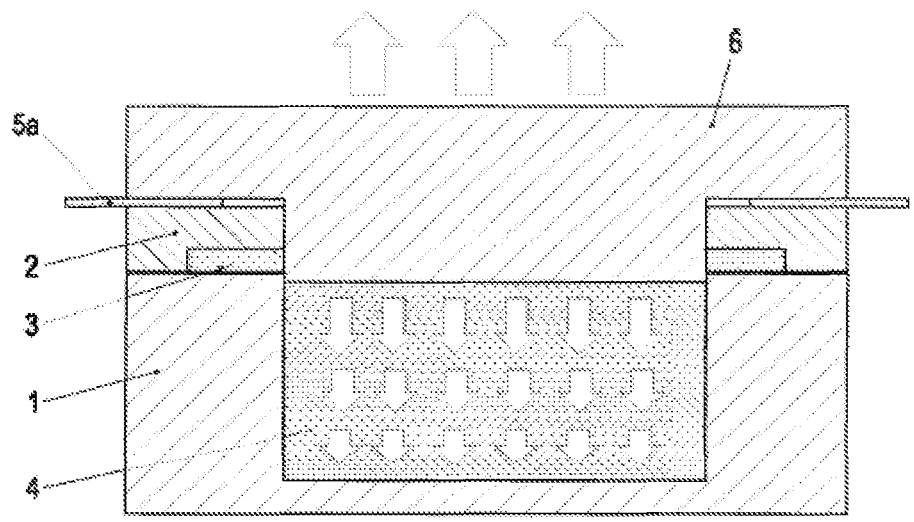
FIG. 14 illustrates the relative movement of the upper mold.

In FIG. 14, the three upward-pointing arrows indicate the relative movement of the upper mold 6, i.e., that the mold is opened here.

Figure 15:
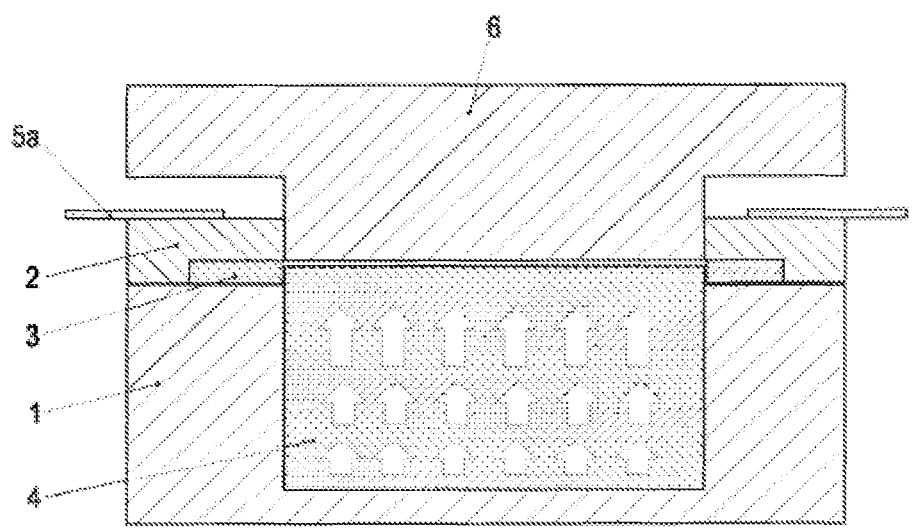
FIG. 15 illustrates the relaxed molded part.
Figure 16:
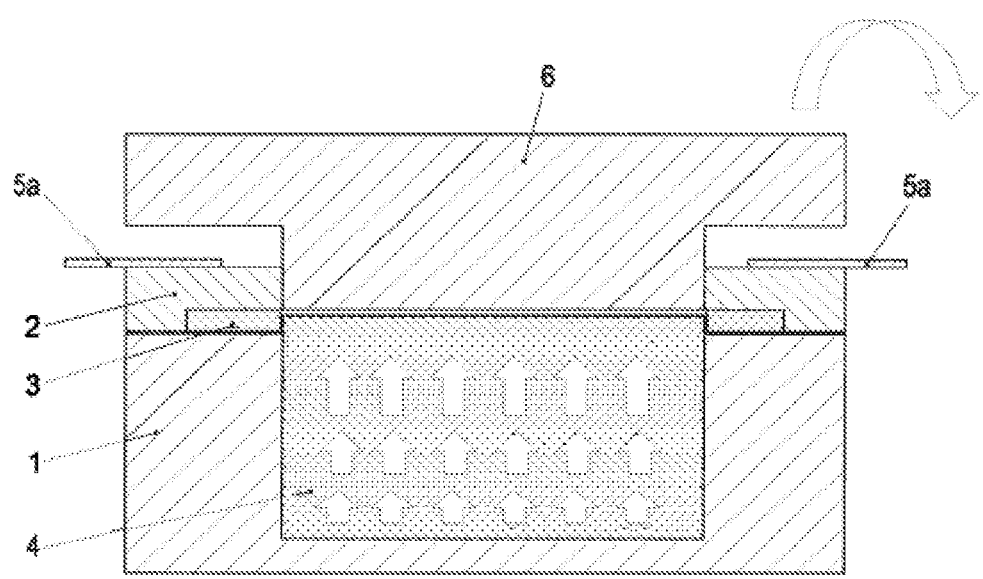
FIG. 16 also illustrates the relaxed molded part.

FIGS. 15 and 16 show the relaxed molded part 4.

If the relative movement of the upper mold 6 is continued, the completely relaxed molded part 4 made of the foamed material is shown.

Figure 17:
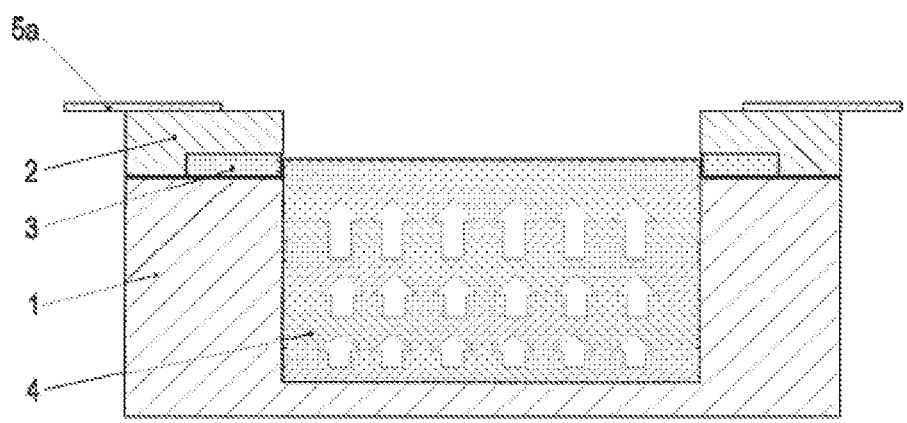
FIG. 17 illustrates the mold when the upper mold has been completely removed.

In FIG. 17, the upper mold 6 has been completely removed.

Figure 18:
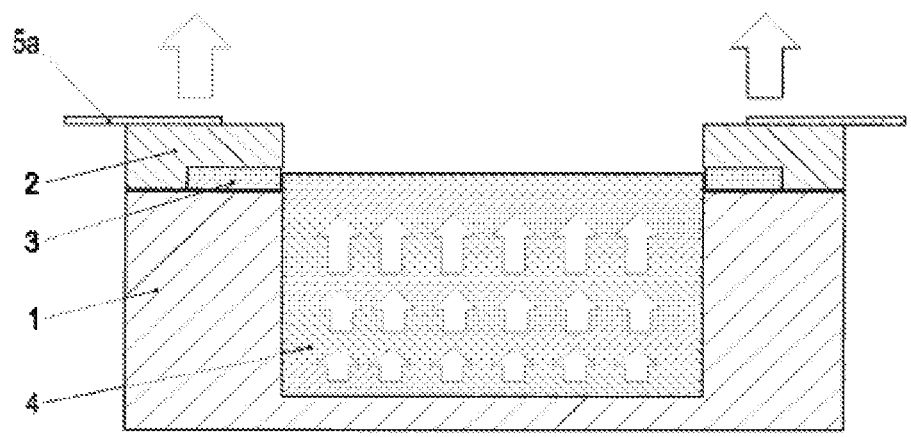
FIG. 18 illustrates the relative movement of the top piece apart from the lower mold.
Figure 19:
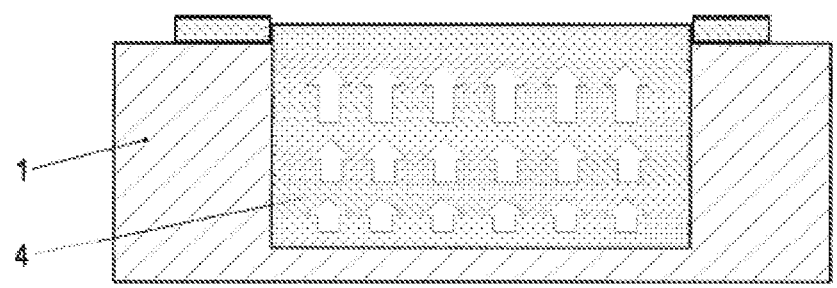
FIG. 19 also illustrates the relative movement of the top piece apart from the lower mold.

FIGS. 18 and 19 show the relative movement of the top piece 2, which is separated from the lower mold 1 here.

Figure 20:
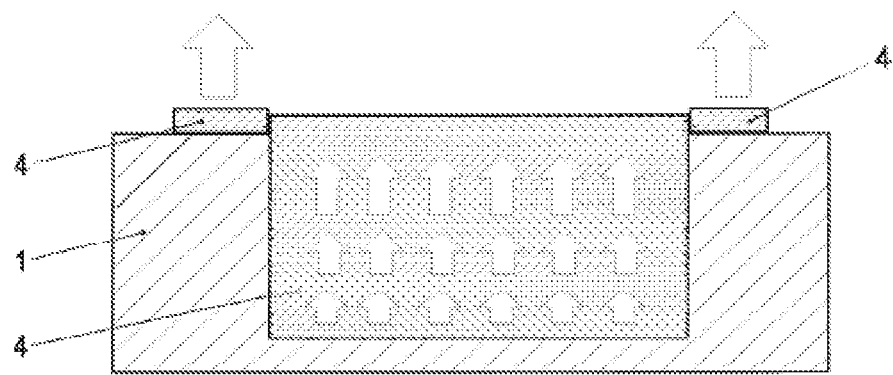
FIG. 20 illustrates the removal of the foamable material.

FIG. 19 shows the lower mold 1, which has been separated from the top piece 2. In the next step, FIG. 20, the foamable material 4 present in the original groove 3 can then be removed, as shown by the two arrows.

Figure 21:
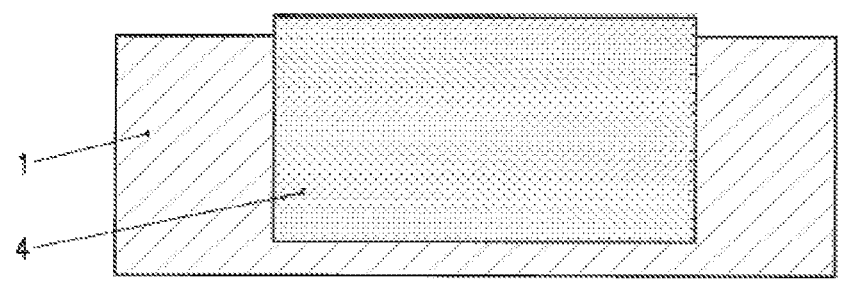
FIG. 21 illustrates the foamed material in the lower mold.
Figure 22:
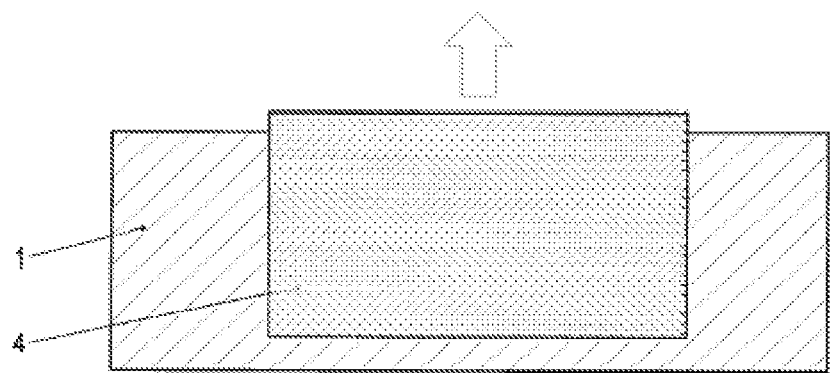
FIG. 22 illustrates the removal of the molded part.

FIG. 21 shows the foamed material 4 present in the lower mold 1, i.e., the molded part 4, which can be removed from the lower mold 1 according to FIG. 22 as shown by the arrow.

Figure 23:
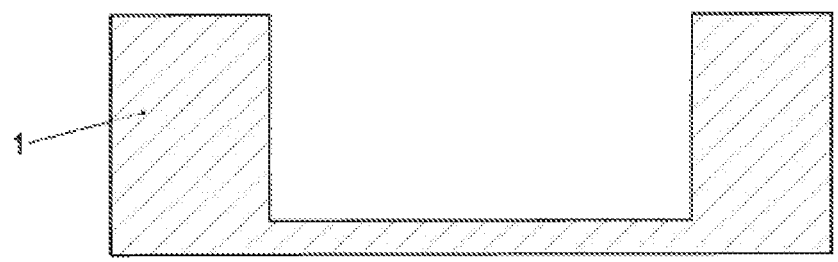
FIG. 23 illustrates the empty lower mold.

FIG. 23 then shows the empty lower mold 1, which can be refilled with foamable material 4 in a new cycle.

It is a matter of course that the inner surfaces of the foaming and punching tool for producing foamed products 4 are to be provided with an appropriate mold release agent if possible, in order to ensure simply removal of the molded part 4.

In addition, for producing integral foam components 4, it is also preferred to design the interior surfaces of the mold to be selectively temperature-controllable, in order to ensure a corresponding density gradient of an integral foam.

Another embodiment of the present invention further includes a method for producing foamed products made of integral foam in a foaming and punching tool comprising a lower mold 1 and a circumferential top piece 2, which forms a groove 3 together with said lower mold 1 that faces the mold cavity, and an upper mold 6, wherein foamable material 4 is added into the lower mold 1, the mold is closed to form a groove 3 between the lower mold 1 and the top piece 2, the foamable material 4 foams to fill the mold cavity and the groove 3, and the foam present in the groove 3 is removed by punching in one or more steps after the foaming and curing of the foam 4 by removing the spacers 5 and allowing the upper mold 6 to penetrate deeper into the mold cavity, the mold is opened completely, and the foam part 4 is removed.

In principle, the use of any foamable materials 4 within the meaning of the present invention is suitable. More preferably within the meaning of the present invention, a polyurethane reaction mixture is employed as a foamable material here.

The invention claimed is:

1. A foaming and punching tool for producing foamed products made of integral foam, comprising a lower mold and a circumferential top piece present at an upper side thereof, which forms a groove together with said lower mold that faces a mold cavity, and an upper mold,
   wherein in a first closed condition said upper mold, due to spacers, penetrates into the mold cavity only to such an extent that the groove can receive foaming material, and
   in a second closed condition said upper mold penetrated deeper into the mold cavity after said spacers have been removed and optionally replaced by thinner spacers, and can remove material present in the groove by punching on its way into a latter condition.

2. The foaming and punching tool for producing foamed products made of integral foam according to claim 1, characterized in that said lower mold and said upper mold can be temperature-controlled each independently of a corresponding mold.

3. The foaming and punching tool for producing foamed products made of integral foam according to claim 1, characterized in that said lower mold and said upper mold and/or are directed mechanically, pneumatically and/or hydraulically.

4. A method for producing foamed products made of integral foam in a foaming and punching tool comprising a lower mold and a circumferential top piece, which forms a groove together with said lower mold that faces the a mold cavity, and an upper mold, wherein foamable material is added into the lower mold, the lower mold is closed to form a groove between the lower mold and the circumferential top piece, the foamable material foams to fill the mold cavity and the groove, and the foamable material present in the groove is removed by punching in one or more steps after foaming and curing of the foam by removing spacers and allowing the upper mold to penetrate deeper into the mold cavity, the lower mold and the upper mold are separated, and a foam part is removed.

5. The method according to claim 4, characterized in that a polyurethane reaction mixture is employed as said foamable material.

6. The method according to claim 4, characterized in that molds and/or are directed mechanically, pneumatically and/or hydraulically.

* * * * *